(12) United States Patent
Samain

(10) Patent No.: US 7,690,726 B2
(45) Date of Patent: Apr. 6, 2010

(54) COUPLING UNIT AND ADJUSTING MECHANISM USING THE COUPLING UNIT

(75) Inventor: Maxime Samain, Emelgem (BE)

(73) Assignee: L&P Swiss Holding Company, Wittenbach (CH)

( * ) Notice: Subject to any disclaimer, the term of this patent is extended or adjusted under 35 U.S.C. 154(b) by 13 days.

(21) Appl. No.: 11/813,606

(22) PCT Filed: Dec. 21, 2005

(86) PCT No.: PCT/EP2005/013789

§ 371 (c)(1),
(2), (4) Date: May 28, 2008

(87) PCT Pub. No.: WO2006/074794

PCT Pub. Date: Jul. 20, 2006

(65) Prior Publication Data

US 2008/0284232 A1     Nov. 20, 2008

(30) Foreign Application Priority Data

Jan. 12, 2005 (EP) .................................. 05000498

(51) Int. Cl.
*B60N 2/22* (2006.01)
(52) U.S. Cl. .................................. 297/284.4
(58) Field of Classification Search ............... 297/284.4
See application file for complete search history.

(56) References Cited

U.S. PATENT DOCUMENTS

| | | | |
|---|---|---|---|
| 1,182,854 A | 5/1916 | Poler | |
| 2,756,809 A | 7/1956 | Endresen | |
| 2,843,195 A | 7/1958 | Barvaeus | |
| 2,922,416 A | 1/1960 | Fader | |
| 2,942,651 A | 6/1960 | Binding | |
| 3,378,299 A | 4/1968 | Sandor | |
| 3,490,084 A | 1/1970 | Schuster | |
| 3,492,768 A | 2/1970 | Schuster | |
| 3,724,144 A | 4/1973 | Schuster | |
| 3,762,769 A | 10/1973 | Poschl | |
| 3,880,463 A | 4/1975 | Shephard et al. | |
| 4,014,422 A | 3/1977 | Morishita | |

(Continued)

FOREIGN PATENT DOCUMENTS

AT         401497        9/1996

(Continued)

OTHER PUBLICATIONS

PCT International Search Report for PCT/EP2005/013789.

*Primary Examiner*—Rodney B White
(74) *Attorney, Agent, or Firm*—Grant D. Kang; Kang Intellectual Property Law, LLC

(57) ABSTRACT

A coupling unit (1) for adjustably mounting a support structure (6, 7) in a seat frame is provided, comprising first connecting means (2, 3) for connecting the support structure (6, 7) with the coupling unit (1) and second connecting means (4, 5) for connecting the coupling unit (1) with a pressure-transmitting element (8, 9) like a Bowden cable, wherein said second connecting means comprise a pressure area for receiving pressure from the pressure-transmitting element. Furthermore, an adjusting mechanism comprising the coupling unit with which a support structure may be adjusted in a seat frame is provided.

15 Claims, 3 Drawing Sheets

U.S. PATENT DOCUMENTS

Figure 1:
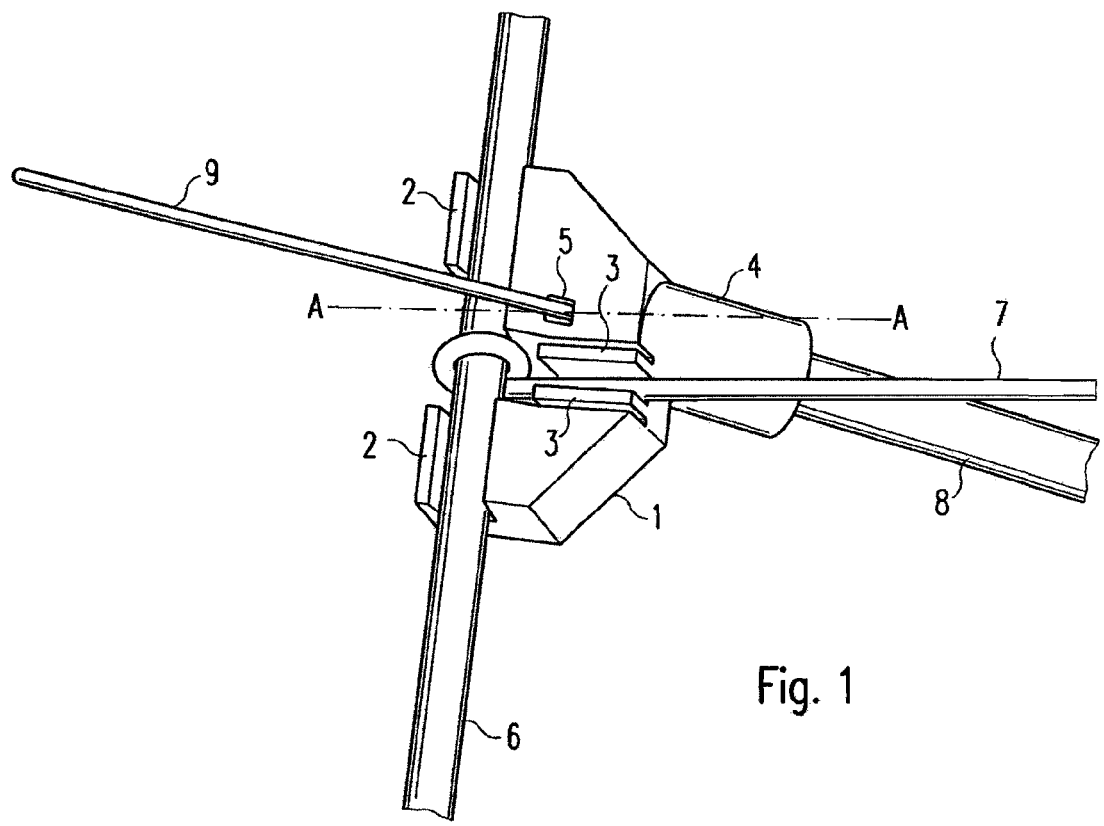

| | | |
|---|---|---|
| 4,136,577 A | 1/1979 | Borgersen |
| 4,153,293 A | 5/1979 | Sheldon |
| 4,156,544 A | 5/1979 | Swenson et al. |
| 4,182,533 A | 1/1980 | Arndt et al. |
| 4,295,681 A | 10/1981 | Gregory |
| 4,313,637 A | 2/1982 | Barley |
| 4,316,631 A | 2/1982 | Lenz et al. |
| 4,354,709 A | 10/1982 | Schuster |
| 4,390,210 A | 6/1983 | Wisniewski et al. |
| 4,449,751 A | 5/1984 | Murphy et al. |
| 4,452,485 A | 6/1984 | Schuster |
| 4,465,317 A | 8/1984 | Schwarz |
| 4,494,709 A | 1/1985 | Takada |
| 4,541,670 A | 9/1985 | Morgenstern et al. |
| 4,555,140 A | 11/1985 | Nemoto |
| 4,556,251 A | 12/1985 | Takagi |
| 4,561,606 A | 12/1985 | Sakakibara et al. |
| 4,564,235 A | 1/1986 | Hatsutta et al. |
| 4,565,406 A | 1/1986 | Suzuki |
| 4,576,410 A | 3/1986 | Hattori |
| 4,601,514 A | 7/1986 | Meiller |
| 4,602,819 A | 7/1986 | Morel |
| 4,627,661 A | 12/1986 | Ronnhult et al. |
| 4,630,865 A | 12/1986 | Ahs |
| 4,632,454 A | 12/1986 | Naert |
| 4,676,550 A | 6/1987 | Neve De Mevergnies |
| 4,679,848 A | 7/1987 | Spierings |
| 4,730,871 A | 3/1988 | Sheldon |
| 4,880,271 A | 11/1989 | Graves |
| 4,909,568 A | 3/1990 | Dal Monte |
| 4,915,448 A | 4/1990 | Morgenstern |
| 4,950,032 A | 8/1990 | Nagasaka |
| 4,957,102 A | 9/1990 | Tan et al. |
| 4,968,093 A | 11/1990 | Dal Monte |
| 5,005,904 A | 4/1991 | Clemens et al. |
| 5,022,709 A | 6/1991 | Marchino |
| 5,026,116 A | 6/1991 | Dal Monte |
| 5,050,930 A | 9/1991 | Schuster et al. |
| 5,076,643 A | 12/1991 | Colasanti et al. |
| 5,088,790 A | 2/1992 | Wainwright et al. |
| 5,112,106 A | 5/1992 | Asbjornsen et al. |
| 5,137,329 A | 8/1992 | Neale |
| 5,174,526 A | 12/1992 | Kanigowski |
| 5,186,412 A | 2/1993 | Park |
| 5,197,780 A | 3/1993 | Coughlin |
| 5,215,350 A | 6/1993 | Kato |
| 5,217,278 A | 6/1993 | Harrison et al. |
| 5,286,087 A | 2/1994 | Elton |
| 5,299,851 A | 4/1994 | Lin |
| 5,335,965 A | 8/1994 | Sessini |
| 5,385,531 A | 1/1995 | Jover |
| 5,397,164 A | 3/1995 | Schuster |
| 5,423,593 A | 6/1995 | Nagashima |
| 5,449,219 A | 9/1995 | Hay et al. |
| 5,452,868 A | 9/1995 | Kanigowski |
| 5,474,358 A | 12/1995 | Maeyaert |
| 5,498,063 A | 3/1996 | Schuster et al. |
| 5,505,520 A | 4/1996 | Frusti et al. |
| 5,507,559 A | 4/1996 | Lance |
| 5,518,294 A | 5/1996 | Ligon, Sr. et al. |
| 5,553,917 A | 9/1996 | Adat et al. |
| 5,562,324 A | 10/1996 | Massara et al. |
| 5,567,010 A | 10/1996 | Sparks |
| 5,567,011 A | 10/1996 | Sessini |
| 5,588,703 A | 12/1996 | Itou |
| 5,609,394 A | 3/1997 | Ligon, Sr. et al. |
| 5,626,390 A | 5/1997 | Schuster et al. |
| 5,638,722 A | 6/1997 | Klingler |
| 5,651,583 A | 7/1997 | Klingler et al. |
| 5,651,584 A | 7/1997 | Chenot et al. |
| 5,704,687 A | 1/1998 | Klingler |
| 5,716,098 A | 2/1998 | Lance |
| 5,718,476 A | 2/1998 | De Pascal et al. |
| 5,758,925 A | 6/1998 | Schrewe et al. |
| 5,762,397 A | 6/1998 | Venuto et al. |
| 5,769,491 A | 6/1998 | Schwarzbich |
| 5,772,281 A | 6/1998 | Massara |
| 5,775,773 A | 7/1998 | Schuster et al. |
| 5,788,328 A * | 8/1998 | Lance ..................... 297/284.4 |
| 5,791,733 A | 8/1998 | Van Hekken et al. |
| 5,816,653 A | 10/1998 | Benson |
| 5,823,620 A | 10/1998 | Le Caz |
| 5,857,743 A | 1/1999 | Ligon, Sr. et al. |
| 5,868,466 A | 2/1999 | Massara et al. |
| 5,884,968 A | 3/1999 | Massara |
| 5,897,168 A | 4/1999 | Bartelt et al. |
| 5,911,477 A | 6/1999 | Mundell et al. |
| 5,913,569 A | 6/1999 | Klingler |
| 5,934,752 A | 8/1999 | Klingler |
| 5,975,632 A | 11/1999 | Ginat |
| 5,984,407 A | 11/1999 | Ligon, Sr. et al. |
| 5,988,745 A | 11/1999 | Deceuninck |
| 6,003,941 A | 12/1999 | Schuster, Sr. et al. |
| 6,007,151 A | 12/1999 | Benson |
| 6,030,041 A | 2/2000 | Hsiao |
| 6,036,265 A | 3/2000 | Cosentino |
| 6,045,185 A | 4/2000 | Ligon, Sr. et al. |
| 6,050,641 A | 4/2000 | Benson |
| 6,079,783 A | 6/2000 | Schuster, Sr. et al. |
| 6,089,664 A | 7/2000 | Yoshida |
| 6,092,871 A | 7/2000 | Beaulieu |
| 6,129,419 A | 10/2000 | Neale |
| 6,139,102 A | 10/2000 | Von Möller |
| 6,152,531 A | 11/2000 | Deceuninck |
| 6,152,532 A | 11/2000 | Cosentino |
| 6,158,300 A | 12/2000 | Klingler |
| 6,227,617 B1 | 5/2001 | Von Möller |
| 6,227,618 B1 | 5/2001 | Ligon, Sr. et al. |
| 6,254,186 B1 | 7/2001 | Falzon |
| 6,254,187 B1 | 7/2001 | Schuster, Sr. et al. |
| 6,270,158 B1 | 8/2001 | Hong |
| 6,296,308 B1 | 10/2001 | Cosentino et al. |
| 6,334,651 B1 | 1/2002 | Duan et al. |
| 6,338,530 B1 | 1/2002 | Gowing |
| 6,364,414 B1 | 4/2002 | Specht |
| 6,430,801 B1 | 8/2002 | Cosentino |
| 6,499,803 B2 * | 12/2002 | Nakane et al. ........... 297/284.4 |
| 6,520,580 B1 | 2/2003 | Hong |
| 6,536,840 B1 | 3/2003 | Schuster, Sr. et al. |
| 6,601,919 B1 * | 8/2003 | Deceuninck ............. 297/284.4 |
| 6,616,227 B2 | 9/2003 | Blendea et al. |
| 6,644,740 B2 | 11/2003 | Holst et al. |
| 6,652,029 B2 | 11/2003 | McMillen |
| 6,666,511 B2 | 12/2003 | Schuster et al. |
| 6,676,214 B2 | 1/2004 | McMillen et al. |
| 6,682,144 B2 | 1/2004 | Klingler |
| 6,905,170 B2 * | 6/2005 | McMillen et al. ......... 297/284.4 |
| 6,994,399 B2 * | 2/2006 | Van-Thournout et al. 297/284.4 |
| 7,137,664 B2 * | 11/2006 | McMillen et al. ......... 297/284.4 |
| 7,140,680 B2 * | 11/2006 | McMillen et al. ..... 297/284.4 X |
| 7,252,335 B2 * | 8/2007 | Samain et al. ........... 297/284.4 |
| 2003/0015901 A1 | 1/2003 | Och et al. |
| 2003/0071501 A1 | 4/2003 | Cruz Fernandes de Pinho |
| 2003/0085600 A1 | 5/2003 | Mori |
| 2003/0111885 A1 | 6/2003 | McMillen |
| 2004/0140705 A1 * | 7/2004 | McMillen et al. ..... 297/284.4 X |
| 2004/0155501 A1 * | 8/2004 | McMillen et al. ........ 297/284.4 |
| 2005/0040686 A1 * | 2/2005 | Van-Thournout et al. 297/284.4 |
| 2005/0200178 A1 * | 9/2005 | Samain et al. ........... 297/284.4 |
| 2009/0184552 A1 * | 7/2009 | Vanparys et al. ......... 297/284.4 |

FOREIGN PATENT DOCUMENTS

| | | | |
|---|---|---|---|
| DE | 2040794 | | 7/1971 |
| DE | 2064419 | | 7/1972 |
| DE | 2947472 | A1 | 8/1980 |
| DE | 3616155 | A1 | 11/1987 |
| DE | 3624396 | A1 | 1/1988 |
| DE | 4220995 | A1 | 1/1994 |
| DE | 19750116 | A1 | 5/1999 |
| DE | 10005215 | C1 | 9/2001 |
| DE | 20107424 | U1 | 11/2001 |
| EP | 0006840 | B1 | 2/1982 |
| EP | 0169293 | B1 | 10/1988 |
| EP | 0296938 | A1 | 12/1988 |
| EP | 0322535 | A1 | 7/1989 |
| EP | 0540481 | A1 | 5/1993 |
| EP | 0563709 | A3 | 10/1993 |
| EP | 0485483 | B1 | 1/1994 |
| EP | 0434660 | B1 | 5/1995 |
| EP | 0540481 | B1 | 12/1995 |
| EP | 0662795 | B1 | 12/1996 |
| EP | 0702522 | B1 | 3/1997 |
| EP | 0696251 | B1 | 7/1997 |
| EP | 0746219 | B1 | 11/1998 |
| EP | 0797399 | B1 | 11/1998 |
| EP | 0698360 | B1 | 3/2000 |
| EP | 1046539 | A1 | 10/2000 |
| FR | 2596334 | A1 | 10/1987 |
| GB | 849798 | | 9/1960 |
| GB | 1423617 | | 2/1976 |
| GB | 2013487 | A | 8/1979 |
| GB | 2059497 | A | 4/1981 |
| GB | 2384176 | A | 7/2003 |
| JP | 2002102011 | A | 9/2002 |
| RU | 587924 | | 2/1978 |
| WO | WO/00/00064 | | 1/2000 |
| WO | WO 03/022626 | | 3/2003 |
| WO | WO 2004/043207 | A2 | 5/2004 |
| WO | WO 2004/043730 | A2 | 5/2004 |

\* cited by examiner

COUPLING UNIT AND ADJUSTING MECHANISM USING THE COUPLING UNIT

CROSS-REFERENCE TO RELATED APPLICATIONS.

This application claims priority to PCT/EP2005/013789 filed on Dec. 21, 2005; which claims priority to European Patent Application No. 05000498.5 filed Jan. 12, 2005.

The present invention relates to a coupling unit for adjustably mounting a support structure in a seat frame and a corresponding adjusting mechanism using the coupling unit. In particular, the present invention relates to a coupling unit usable in connection with a support structure having a wire framework comprising two lateral side wires and a plurality of transverse wires extending between the two lateral side wires and providing load bearing support for upholstery of a seat like a vehicle seat.

Support structures of the aforementioned kind are well-known in the art and may have various configurations determined by the design of a seat in which the support structure is to be mounted. Such a support structure is for example known from GB 2 342 287 A. The support structure disclosed in this prior art document comprises a wire framework having two lateral side wires suspendable in a seat frame and between which extend a plurality of transverse wires which provide load bearing support for upholstery of a seat. The transverse wires are attached to the lateral side wires by being wound around the latter in the form of a helix with an end portion of the respective transverse wire extending substantially perpendicular to the respective lateral side wire. Some of the transverse wires extend beyond the respective lateral side wire and terminate in free ends which can be formed as hook-like fingers for attachment to the seat frame, for example by providing eyes at the seat frame into which the hook-like fingers of the support structure may be hooked. Other known attachment means comprise springs for coupling the support structure with the seat frame.

Furthermore, it is known from EP 0 552 904 B1 to provide adjusting mechanisms for such support structures. The support structure disclosed in this prior art document is attached to a seat frame via springs, and Bowden cable mechanisms are provided with which the support structure can be pivoted at hinge points provided in lateral side wires thereof. A further mechanism without such hinges is known from U.S. Pat. No. 5,988,745 A.

In these support structures, the suspension of the support structure in the seat frame and the adjusting mechanism are realized separately, leading to an increased number of parts needed and therefore to additional costs.

It is therefore an object of the present invention to provide a coupling unit for adjustably mounting a support structure in a seat frame and a corresponding adjusting mechanism wherein it is possible to mount a support structure adjustably in a seat frame with a minimum number of parts needed and with a simple structure.

This object is achieved by a coupling unit according to claim 1. The dependent claims define preferred or advantageous embodiments of the coupling unit and an adjusting mechanism using said coupling unit.

According to the invention, a coupling unit for adjustably mounting a support structure in a seat frame is provided, comprising first connecting means for connecting the support structure with the coupling unit, and second connecting means for connecting the coupling unit with a pressure-transmitting element, wherein said second connecting means comprise a pressure area for receiving pressure from the pressure transmitting element.

With such a unit, a support structure may easily be connected with a pressure-transmitting element, which on the one hand may then be used to transmit pressure to the support structure to adjust the same and on the other hand to mount the support structure to a seat frame. Furthermore, by transmitting pressure to the pressure area, the support structure can be pushed in the direction of the pressure, while in conventional structures the support structure is usually pulled by a wire fixed in one point. Since in the present invention a pressure area is used, the force acting on a single point is reduced. Therefore, weaker materials which are cheaper may be used, e.g. plastic instead of steel.

The second connecting means may in particular be adapted for connecting the coupling unit with a pressure-transmitting element comprising a sleeve and a wire running within said sleeve, for example a Bowden cable. In this case, the sleeve serves for transmitting pressure by abutting against the pressure area, and the wire may serve to attach the support structure to the seat frame. To achieve this, the second connecting means may comprise a through hole extending from a first side of the coupling unit to a second side of the coupling unit, wherein the through hole may, at one side thereof, have a diameter corresponding to the outer diameter of the sleeve, and at the other side, a diameter corresponding to the outer diameter of the wire of the pressure transmitting element. In the through hole, a step or shoulder may be incorporated serving as the pressure area.

The coupling unit may be designed such that the direction in which the pressure is transmitted to the pressure area when the pressure-transmitting element is connected with the coupling unit via the second connecting means forms a non-zero angle with a plane defined by the support structure when connected with the coupling unit via the first connecting means.

Preferably, the first connecting means are designed for connecting the coupling unit with a support structure comprising two lateral side wires and a plurality of transverse wires extending therebetween. In this case, the first connecting means may in particular be designed for receiving one of said lateral side wires and one of said transverse wires, preferably by clips, so that the position of the coupling unit with respect to the support structure is fixed. As an alternative to the clips, a through hole may be provided for receiving a lateral side wire or a transverse wire.

A corresponding adjusting mechanism for a support structure comprises at least one of the aforementioned coupling units, a pressure transmitting element coupled with the coupling unit via the second connecting means and attachment means provided at the pressure-transmitting element for attaching the pressure transmitting element to a seat frame. In the preferred case that the pressure-transmitting element comprises a wire and a sleeve as described above, the attachment means may comprise a hook attached to the wire of the pressure-transmitting element.

Figure 2:
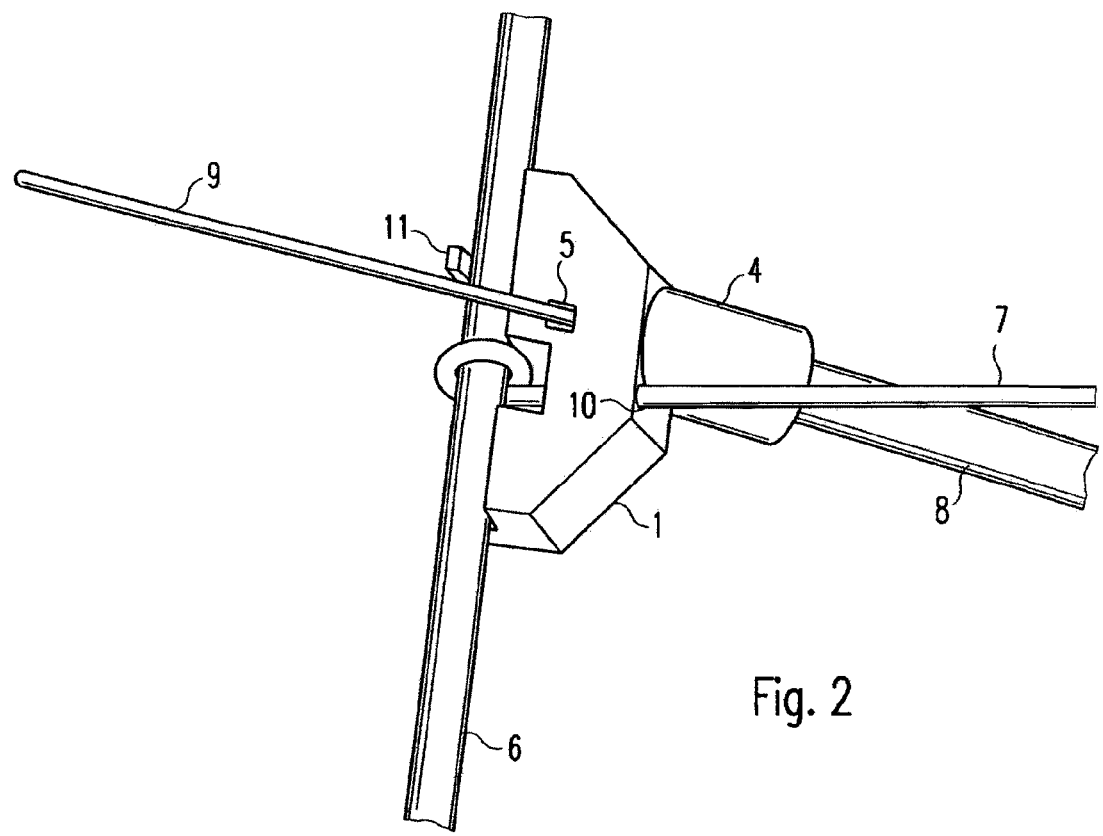
Figure 3:
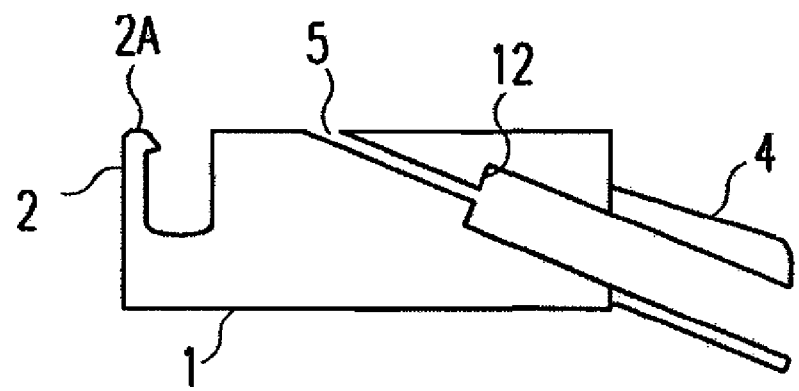
Figure 4:
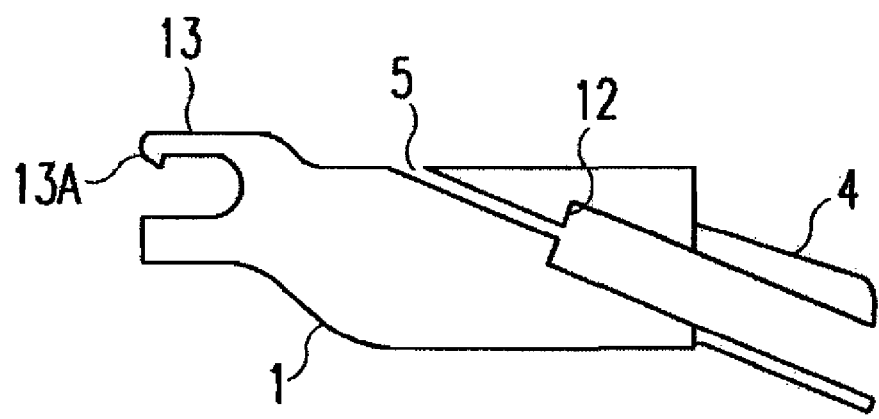
Figure 5:
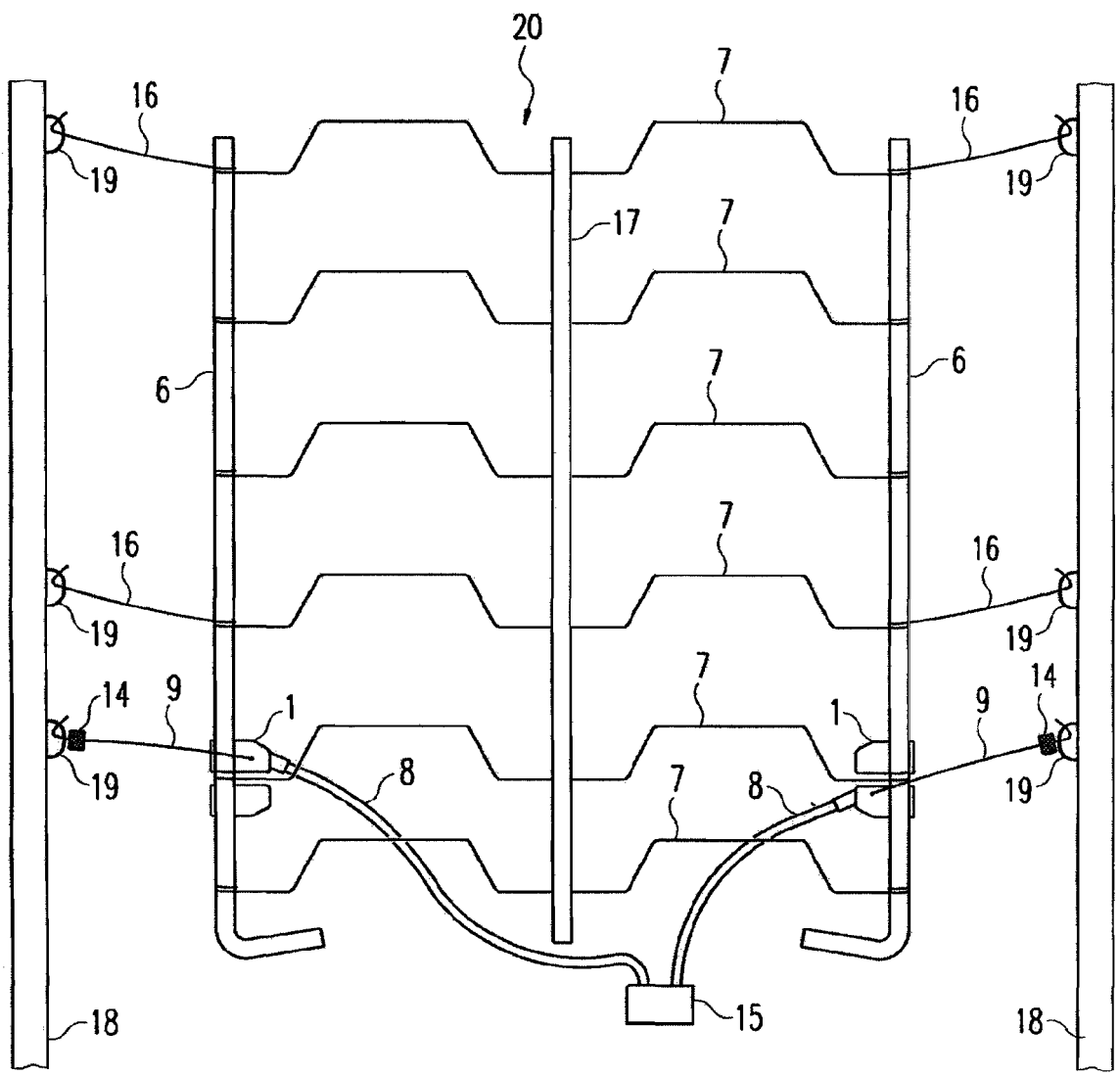
Figure 6:
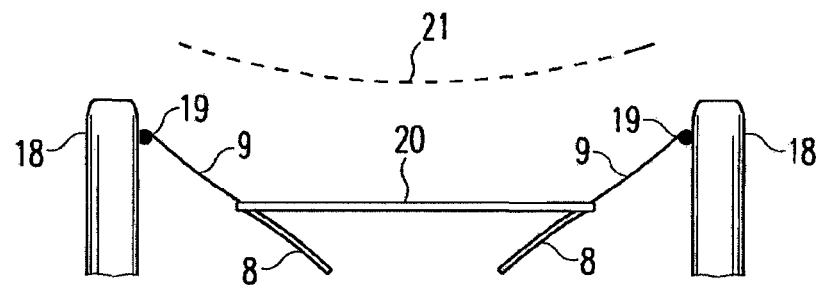

In the following, preferred embodiments of the present invention are described in greater detail with reference to the accompanying drawings, wherein:

FIG. 1 is a perspective view of a first embodiment of a coupling unit according to the present invention, FIG. 2 is a perspective view of a second embodiment of a coupling unit of the present invention, FIG. 3 is a schematic sectional view taken along a line A-A of FIG. 1, FIG. 4 is a sectional view of a third embodiment of a coupling unit according to the present invention, FIG. 5 is a plan view of a support structure adjustably mounted in a seat frame using the coupling unit of the present invention, and FIG. 6 is a schematic cross-sectional view of the support structure of FIG. 5.

In the following, embodiments of a coupling unit for adjustably mounting a support structure to a seat frame and an adjusting mechanism incorporating the coupling unit will be described. In the following specification, as an exemplary support structure a wire frame as described already in the introduction will be used, i.e. a wire frame comprising two lateral side wires and transverse wires connecting the lateral side wires. However, it is to be understood that the present invention may also be used in connection with other types of support structures, e.g. plate-like structures. Furthermore, as an exemplary pressure-transmitting element for applying pressure to the coupling unit, an element comprising a sleeve and a wire running within the sleeve like a Bowden cable is used.

In FIG. 1, a first embodiment of a coupling unit 1 is shown. The coupling unit 1 is preferably made of a plastic material like polyamide, in particular PA 6.6, by moulding or the like. The coupling unit 1 in the embodiment shown in FIG. 1 is used to couple a support structure having two lateral side wires and a plurality of transverse wires as explained above, of which a lateral side wire 6 and a transverse wire 7 are partially shown, with a pressure transmitting element having a sleeve 8 and a wire 9 running in the sleeve 8.

The coupling unit 1 is designed to connect with the support structure at a portion where the transverse wire 7 is fixed to the lateral side wire 6 by being would around the latter. To accommodate the lateral side wire 6 and the transverse wire 7, in the embodiment of FIG. 1 grooves or recesses are formed, wherein the lateral side wire 6 and the transverse wire 7 are clipped. In particular, the lateral side wire 6 is held between a main body of the coupling unit 1 and clipping side walls 2, whereas the transverse wire 7 is clipped between side walls 3, which are free standing to have the resiliency necessary so that the transverse wire 7 may be inserted and held securely between the side walls 3.

A socket 4 is provided at a side face of the coupling unit 1 and preferably integrally formed therewith. The socket 4 serves for receiving the sleeve 8 of the pressure transmitting element. An opening of the socket 4 for receiving the sleeve 8 forms one side of a through hole which extends through the coupling unit 1 to an opening 5 having a diameter slightly greater than an outer diameter of the wire 9, but smaller than an outer diameter of the sleeve 8, so that the wire 9 may pass through the opening 5 as shown in FIG. 1.

As can be seen, by means of the coupling unit 1 the pressure-transmitting element 8, 9 is securely coupled to the support structure having the lateral side wire 6 and the transverse wire 7.

FIG. 2 shows a second embodiment of the coupling unit which is a variant of the coupling unit 1 described with reference to FIG. 1. Consequently, only the differences between the coupling unit 1 shown in FIG. 1 and the coupling unit 1 shown in FIG. 2 will be explained.

In contrast to the coupling unit 1 shown in FIG. 1, in the coupling unit 1 shown in FIG. 2 no clipping mechanism, i.e. no side walls 3, for receiving the transverse wire 7 is provided. In contrast, the transverse wire 7 in FIG. 2 is accommodated in a through hole 10 extending through the coupling unit 1 of FIG. 2. Because of the through hole 10, the transverse wire 7 is fixed even more securely to the coupling unit 1 than in the embodiment of FIG. 1. With such a coupling unit the transverse wire 7 may be "shooted" through the coupling unit 1 during the production process, making manufacturing of a corresponding support structure very efficient.

As the transverse wire 7 is accommodated securely in the coupling unit 1 in the embodiment of FIG. 2, the side walls 2 holding the lateral side wire 6 in FIG. 1 are not absolutely necessary and may be left out or replaced by only a small clip 11.

Otherwise, the coupling unit 1 of FIG. 2 is similar to the coupling unit 1 of FIG. 1, in particular with respect to the accommodation of the pressure-transmitting element 8, 9.

In FIG. 3, a sectional view taken along a line A-A of FIG. 1 is illustrated showing in particular the through hole connecting the opening of the socket 4 with the opening 5. In particular, the through hole, starting from the opening of the socket 4, has a diameter corresponding to the outer diameter of the sleeve 8 of FIG. 1 until a step or a shoulder 12 is reached, where the through hole narrows and continues with a diameter corresponding to the outer diameter of the wire 9. When the pressure-transmitting element 8, 9 is accommodated in the through hole, an end portion or end face of the sleeve 8 where the wire 9 exits the sleeve 8 abuts against the shoulder 12 and therefore can transmit pressure onto the shoulder 12, which therefore acts as a pressure-receiving area. As will be explained later with reference to FIGS. 5 and 6, this can be used for adjusting a support structure.

Furthermore, as shown in FIG. 3, the side wall 2 has a nose 2A at an upper end thereof. The nose 2A has an angled portion at its upper side and a straight portion at its lower side. When the lateral side wire 6 is inserted into the coupling unit 1, it presses against the angled portion of the nose 2A and bends the nose 2A sidewards and can thus be inserted into the coupling unit 1. Because of the straight portion of the nose 2A at its lower side, the lateral side wire 6 then held securely in the coupling unit 1. However, the nose 2A is not a necessary feature, and the holding of the transverse wire 6 in the coupling unit 1 can be secured by other means. Furthermore, no special means for securing the lateral side wire 6 (and the transverse wire 7) in the coupling unit 1 may have to be taken if, in a structure like the one shown in FIG. 1, the wire 9 is constantly under tension so that the lateral side wire 6 and the transverse wire 7 are pressed into the corresponding grooves or recesses.

In FIG. 4, a sectional view of a third embodiment of a coupling unit 1 according to the present invention is shown which is a variant to the embodiments already described. In particular, FIG. 4 shows a cross-section in the same area as FIG. 3. In contrast to the embodiment of FIGS. 1-3, the lateral side wire 6 is not inserted from an upper side of the coupling unit 1 into the coupling unit, but from a lateral side thereof (the left side in FIG. 4). Therefore, a recess or groove is defined opening to that lateral side and being delimited on one side by a resilient side wall 13 having a nose 13A which has the same function as the side wall 2 having the nose 2A in FIG. 3.

It should be noted while connecting the coupling unit 1 to the support structure at an area where a transversal side wire is coupled with a lateral side wire gives a greater stability of the coupling in particular against rotation, in principle the coupling unit may be coupled to the lateral side wire 6 (or a transversal wire) only. In this case, as a matter of course only a recess or groove for the respective side wire has to be provided.

Next, with reference to FIGS. 5 and 6, an adjusting mechanism based on the coupling unit 1 described with reference to FIGS. 1-4 for adjustably mounting a support structure, generally designated with reference numeral 20, in a seat frame will be described.

The support structure 20, as already explained, comprises two lateral side wires 6 and a plurality of transverse wires 7 extending between the side wires 6, wherein for attaching the transverse wires 7 to the lateral side wires 6 the former are wound around the latter with their end portions. Some transverse wires 7 extend beyond the lateral side wires 6 to form free ends 16. End portions of the free ends 16 are bent to hook-like shapes. Furthermore, the support structure 20 comprises a central tube or cord 17 running basically parallel to the lateral side wires 6 and having through holes through which the transverse wires 7 pass. The central cord 17 serves to preserve a predefined spacing between the transverse wires 7. The transverse wires 7 as shown in FIG. 5 additionally have angled portions or convolutions which provide a transversal resiliency to the transverse wires 7. Such support structures 20 are known from the prior art documents cited in the introductory portion.

As shown in FIG. 5, the support structure 20 is mounted to a seat frame, of which only lateral portions 18 are shown. The lateral portions 18 of the seat frame have eyes 19. For attaching the support structure 20, the hook-like ends of the extended portions 16 are hooked into respective eyes 19.

Furthermore, near a lower end, each of the lateral side wires 6 is provided with a coupling unit 1. The coupling unit 1 may take any of the forms described above with reference to FIGS. 1 through 4. It should be noted that the coupling units 1 may be connected with the support structure during manufacture of the latter, which is in particular advantageous in connection with the embodiment of FIG. 2. It is also possible that the coupling units are directly molded onto the support structure 20.

Furthermore, in each of the coupling units 1, a pressure-transmitting element having a sleeve 8 and a wire 9 running in the sleeve is accommodated as also already described with reference to FIGS. 1 through 4. At an end portion of each of the wires 9, hooks 14 are attached which are hooked into further ones of the eyes 19. The pressure transmission elements may in particular be Bowden cables.

Therefore, by means of the coupling units 1 and the pressure-transmitting elements 8, 9, a further connection of the support structure 20 with the side portions 18 of the seat frame is established. It should be noted that the hook-like end portions of the extended portions 16 and also the hooks 14 need not be directly hooked into the eyes 19 but may also be connected with the side portions 18 for example via springs.

Ends of the pressure-transmitting elements 8, 9 not coupled to the coupling units end in an actuator unit 15. By means of the actuator unit 15, the length of the wires 9 running in the sleeves 8 may be lengthened or shortened, for example by winding the wires 9 onto a drum rotated by an electric motor. Such actuator means are well-known in the art and need not be described in detail.

When the wires 9 are shortened, e.g. wound on the drum, the ends of the sleeves 8 exert pressure on the shoulders 12 of the coupling units 1 (see FIGS. 3, 4), so that the respective portions of the lateral side wires 6 are pushed towards the eyes 19 in which the respective wires 9 are anchored by means of the hooks 14. As the eyes 19 are located closer to a surface side of the seat frame against which, in the complete seat, a back of an occupant is rested, this means that the lower portion of the support structure 20 is pulled toward the back of the occupant. This can be easier understood with reference to FIG. 6 showing a sectional view of the structure of FIG. 5. Here, it can be seen that the eyes 19 are located closer toward a back 21 (indicated schematically as a dashed line) of an occupant than the support structure 20. Therefore, when the wires 9 are shortened as described above, the sleeves 8 of the pressure-transmitting elements push the portion of the support structure 20 where the coupling units 1 are provided toward the back 21. The portion where the coupling units 1 are provided may for example correspond to a lumbar portion of the seat so as to provide an adjustable lumbar support for the occupant. However, the mechanism may also serve to provide adjusting support at other portions of the seat, for example a shoulder portion, or may be also applied to a seat portion upon which an occupant is seated.

It should be noted that since, as seen in FIG. 5, the wires 9 leave the coupling units 1 on an inner side of the lateral side wires 6, i.e. the side facing the respective other lateral side wire 6, the coupling units 1 tend to be rotated slightly around the lateral side wires 6 when the wires 9 are shortened, which brings the ends of the transverse wire 7 coupled with the coupling units 1 even closer to the back 21, providing a stronger adjustment.

As already described above, the support structure 20 shown in FIG. 5 having the lateral side wires 6 and the transverse wires 7 serves only as an example, and other support structures, like plate-like support structures, may be used as well. In this case, the portions of the coupling units 1 which serve to connect the coupling unit 1 with the support structure have to be adapted accordingly. Furthermore, while the coupling units 1 are preferably made of a plastic material, other materials like metals are possible as well.

In summary, the coupling units of the present invention provide an efficient means for adjustably coupling a support structure with a seat frame, making the production of adjustable seat structures easier and faster.

The invention claimed is:

1. A coupling unit for adjustably mounting a support structure in a seat frame, comprising
    first connecting means for connecting the coupling unit with the support structure, and second connecting means for connecting the coupling unit with a pressure-transmitting element, wherein said second connecting means comprise a pressure area for receiving pressure from said pressure-transmitting element
    wherein the second connecting means are designed for connecting the coupling unit with a pressure-transmitting element comprising a sleeve and a wire located within the sleeve, and
    wherein the second connecting means comprise a through hole extending between two faces of the coupling unit, wherein a first diameter of a first opening of the through hole corresponds to an outer diameter of said sleeve and a second diameter of a second opening of the through hole corresponds to an outer diameter of said wire.
2. The coupling unit according to claim 1,
    wherein the second connecting means comprise a socket for receiving the pressure-transmitting element.
3. The coupling unit according to claim 1,
    wherein the through hole comprises a step forming said pressure area at a location where the diameter of the through hole changes from said first diameter to said second diameter.
4. The coupling unit according to claim 1,
    wherein said first connecting means are designed for coupling the coupling unit with at least one wire of the support structure.

5. The coupling unit according to claim 4,
wherein said first connecting means comprise clipping means for clipping the at least one wire into the coupling unit.
6. The coupling unit according to claim 4,
wherein said first connecting means comprise a further through hole for receiving a wire of the at least one wire.
7. The coupling unit according to claim 4,
wherein the at least one wire comprises a lateral side wire and a transverse wire coupled to the lateral side wire such that the transverse wire runs basically perpendicular to the lateral side wire.
8. The coupling unit according to claim 1,
wherein the second connecting means are designed such that a pressure-transmitting element accommodated in said second connecting means exerts pressure on the coupling unit in a direction forming a non-zero angle with a plane defined by said support structure when connected with the coupling unit via the first connecting means.
9. The coupling unit according to claim 1,
wherein the coupling unit is formed in one piece.
10. The coupling unit according to claim 1,
wherein the coupling unit is made of plastic material.
11. An adjusting mechanism for adjustably mounting a support structure in a seat frame,
comprising
at least one coupling unit, said coupling unit comprising:
first connecting means for connecting the coupling unit with the support structure, and
second connecting means for connecting the coupling unit with a pressure-transmitting element, wherein said second connecting means comprise a pressure area for receiving pressure from said pressure-transmitting element, and
at least one pressure-transmitting element connected to said at least one coupling unit, said pressure-transmitting element further comprising attachment means for attaching the pressure-transmitting element to said seat frame
wherein the second connecting means are designed for connecting the coupling unit with a pressure-transmitting element comprising a sleeve and a wire located within the sleeve, and
wherein the second connecting means comprise a through hole extending between two faces of the coupling unit, wherein a first diameter of a first opening of the through hole corresponds to an outer diameter of said sleeve and a second diameter of a second opening of the through hole corresponds to an outer diameter of said wire.
12. The adjusting mechanism according to claim 11,
wherein said at least one pressure-transmitting element comprises a sleeve and a wire located in that sleeve, wherein said sleeve abuts against a pressure area of said at least one coupling unit and said attachment means are attached to said wire.
13. The adjusting mechanism according to claim 12,
wherein the adjusting mechanism further comprises actuator means for reversibly shortening the effective length of said wire.
14. A seat structure,
comprising a support structure,
a seat frame, and
an adjusting mechanism comprising:
at least one coupling unit, said coupling unit comprising:
first connecting means for connecting the coupling unit with the support structure, and
second connecting means for connecting the coupling unit with a pressure-transmitting element, wherein said second connecting means comprise a pressure area for receiving pressure from said pressure-transmitting element, and
at least one pressure-transmitting element connected to said at least one coupling unit, said pressure-transmitting element further comprising attachment means for attaching the pressure-transmitting element to said seat frame,
said adjusting mechanism adjustably mounting said support structure to said seat frame wherein the second connecting means are designed for connecting the coupling unit with a pressure-transmitting element comprising a sleeve and a wire located within the sleeve, and
wherein the second connecting means comprise a through hole extending between two faces of the coupling unit, wherein a first diameter of a first opening of the through hole corresponds to an outer diameter of said sleeve and a second diameter of a second opening of the through hole corresponds to an outer diameter of said wire.
15. The seat structure according to claim 14
wherein said support structure comprises two lateral side wires and transverse wires running between the lateral side wires.

* * * * *